US011017418B1

(12) United States Patent
    Avratiner

(10) Patent No.: US 11,017,418 B1
(45) Date of Patent: May 25, 2021

(54) MERCHANT SERVICES STATEMENTS AND PRICING

(71) Applicant: Wells Fargo Bank, N.A., San Francisco, CA (US)

(72) Inventor: Igor Avratiner, Philadelphia, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 465 days.

(21) Appl. No.: 15/890,947

(22) Filed: Feb. 7, 2018

(51) Int. Cl.
    *G06Q 30/02*    (2012.01)
    *G06Q 20/32*    (2012.01)

(52) U.S. Cl.
    CPC ..... *G06Q 30/0206* (2013.01); *G06Q 20/3276* (2013.01); *G06Q 30/0201* (2013.01); *G06Q 30/0205* (2013.01)

(58) Field of Classification Search
    None
    See application file for complete search history.

(56) References Cited

U.S. PATENT DOCUMENTS

| | | | |
|---|---|---|---|
| 7,392,222 B1 | 6/2008 | Hamilton et al. | |
| 8,175,908 B1 * | 5/2012 | Anderson | G06Q 30/0201 705/7.29 |
| 10,304,056 B1 * | 5/2019 | Izenson | G06Q 20/40 |
| 2004/0024707 A1 | 2/2004 | Perre et al. | |
| 2011/0153481 A1 | 6/2011 | Hamby | |

(Continued)

FOREIGN PATENT DOCUMENTS

| | | | | |
|---|---|---|---|---|
| CA | 2998249 A1 | * | 9/2018 | ............. G06N 20/00 |
| WO | WO-2010025298 A2 | * | 3/2010 | ............. G06Q 30/00 |
| WO | WO-2010025301 A2 | * | 3/2010 | ............. G06Q 30/00 |

OTHER PUBLICATIONS

Awoyemi, John O., Adebayo O. Adetunmbi, and Samuel A. Oluwadare. "Credit card fraud detection using machine learning techniques: A comparative analysis." 2017 International Conference on Computing Networking and Informatics (ICCNI). IEEE, 2017. (Year: 2017).*

(Continued)

*Primary Examiner* — Matthew S Gart
*Assistant Examiner* — Derick J Holzmacher
(74) *Attorney, Agent, or Firm* — Merchant & Gould P.C.

(57) ABSTRACT

A method for obtaining credit card pricing for a merchant includes obtaining a merchant category classification (MCC) code. A sales volume, a number of credit card transactions, an average dollar amount of the credit card transactions and a percentage of credit card transactions that are keyed are obtained. The MCC code, the average dollar amount of the of credit card transactions processed and the percentage of credit card transactions that are keyed are compared with corresponding data from a database of merchant credit card transactions. A matched merchant is identified whose transaction profile closely matches a combination of the MCC code, the average dollar amount of the credit card transactions processed and the percentage of credit card transactions that are keyed. Credit card processing pricing information for the matched merchant is obtained from the database. The credit card processing pricing information is used to calculate credit card processing pricing for the matched merchant.

16 Claims, 7 Drawing Sheets

(56) References Cited

U.S. PATENT DOCUMENTS

| | | | |
|---|---|---|---|
| 2012/0004964 A1* | 1/2012 | Satyavolu | H04M 15/44 705/14.17 |
| 2012/0004965 A1* | 1/2012 | Satyavolu | G06Q 30/0215 705/14.17 |
| 2012/0004966 A1* | 1/2012 | Satyavolu | H04M 15/84 705/14.17 |
| 2012/0004967 A1* | 1/2012 | Satyavolu | H04M 15/84 705/14.17 |
| 2012/0004968 A1* | 1/2012 | Satyavolu | G06Q 20/387 705/14.17 |
| 2012/0004969 A1* | 1/2012 | Satyavolu | H04M 15/80 705/14.17 |
| 2012/0004970 A1* | 1/2012 | Satyavolu | G06Q 30/0215 705/14.17 |
| 2012/0004975 A1* | 1/2012 | Satyavolu | H04M 15/805 705/14.27 |
| 2012/0010932 A1* | 1/2012 | Satyavolu | H04M 15/8011 705/14.17 |
| 2012/0010933 A1* | 1/2012 | Satyavolu | H04M 15/745 705/14.17 |
| 2012/0010936 A1* | 1/2012 | Satyavolu | H04M 15/00 705/14.25 |
| 2012/0053987 A1* | 3/2012 | Satyavolu | H04M 15/85 705/7.29 |
| 2013/0191213 A1* | 7/2013 | Beck | G06Q 30/0207 705/14.53 |
| 2013/0268431 A1* | 10/2013 | Mohsenzadeh | G06Q 20/227 705/39 |
| 2013/0325667 A1* | 12/2013 | Satyavolu | G06Q 30/0629 705/26.64 |
| 2013/0325680 A1* | 12/2013 | Satyavolu | H04M 15/8044 705/35 |
| 2013/0347064 A1* | 12/2013 | Aissi | G06F 21/44 726/2 |
| 2014/0081779 A1* | 3/2014 | Murphy | G06Q 20/401 705/16 |
| 2014/0081780 A1* | 3/2014 | Murphy | G06Q 20/40 705/17 |
| 2014/0089118 A1* | 3/2014 | Templeton | G06Q 20/28 705/21 |
| 2014/0095364 A1* | 4/2014 | Satyavolu | H04M 15/8044 705/35 |
| 2014/0108166 A1* | 4/2014 | Murphy | G06Q 20/3274 705/16 |
| 2014/0108167 A1* | 4/2014 | Murphy | G06Q 20/20 705/16 |
| 2014/0108168 A1* | 4/2014 | Murphy | G06Q 40/02 705/16 |
| 2014/0129423 A1* | 5/2014 | Murphy | G06Q 20/10 705/39 |
| 2014/0129424 A1* | 5/2014 | Murphy | G06Q 30/0283 705/39 |
| 2014/0129443 A1* | 5/2014 | Whitler | G06Q 20/085 705/44 |
| 2014/0143024 A1* | 5/2014 | Whitler | G06Q 10/0637 705/7.36 |
| 2014/0143135 A1* | 5/2014 | Murphy | G06Q 20/22 705/39 |
| 2014/0172537 A1* | 6/2014 | Weigman | G06Q 20/22 705/14.35 |
| 2014/0172560 A1* | 6/2014 | Satyavolu | H04M 15/8011 705/14.53 |
| 2014/0257977 A1* | 9/2014 | Mohsenzadeh | G06Q 20/227 705/14.51 |
| 2015/0220958 A1* | 8/2015 | Tietzen | G06Q 30/0213 705/14.15 |
| 2015/0348083 A1* | 12/2015 | Brill | G06Q 20/386 705/14.23 |
| 2016/0104187 A1* | 4/2016 | Tietzen | G06Q 30/0233 705/14.33 |
| 2016/0203497 A1* | 7/2016 | Tietzen | G06Q 30/0226 705/14.27 |
| 2017/0169670 A1* | 6/2017 | Murphy | G06Q 40/12 |
| 2018/0276710 A1* | 9/2018 | Tietzen | G06N 20/00 |

OTHER PUBLICATIONS

Thennakoon, Anuruddha, et al. "Real-time credit card fraud detection using machine learning." 2019 9th International Conference on Cloud Computing, Data Science & Engineering (Confluence). IEEE, 2019. (Year: 2019).*

Ryman-Tubb, Nick F., Paul Krause, and Wolfgang Garn. "How Artificial Intelligence and machine learning research impacts payment card fraud detection: A survey and industry benchmark." Engineering Applications of Artificial Intelligence 76 (2018): 130-157. (Year: 2018).*

* cited by examiner

300

302 — Time Period – October 2017

304 — MCC Code = 5732

306 — MCC Description: Electronic Sales

| Card Type | Transactions | Sales Volume | % Keyed |
|---|---|---|---|
| Visa | 40 | 20,000.00 | 50% |
| Master Card | 15 | 7,500.00 | 50% |
| Discover Card | 10 | 4,000.00 | 40% |
| AMEX | 5 | 5,000.00 | 15% |
| Total | 70 | 36,500.00 | 44% |

Summary for Statement Period

| | |
|---|---|
| Total Amount Submitted | $23,283.64 |
| Adjustments | 0.00 |
| Fees Charged | - $921.10 |
| Total Amount Processed | $22,362.54 |

604

Summary By Card Type

| | Average | Items | Total Amount |
|---|---|---|---|
| Master Card | $24.78 | 157 | $3,890.03 |
| Visa | $18.99 | 520 | $9,874.78 |
| AMEX | $22.47 | 66 | $1,483.25 |
| Debit/ATM | $27.24 | 295 | $8,035.58 |
| Total | | 1,038 | $23,283.64 |

606

Transactions

| Date | Submitted Amount | Fees | Processed Amount |
|---|---|---|---|
| Transaction 1 | | | |
| ... | | | |
| Transaction n | | | |
| Total | | | |

608

| Fees Charged | Total |
|---|---|
| Interchange Charges | $736.88 |
| Payment Network Fees | $46.06 |
| Organization Fees | $138.16 |
| Total | $921.10 |

FIG. 6

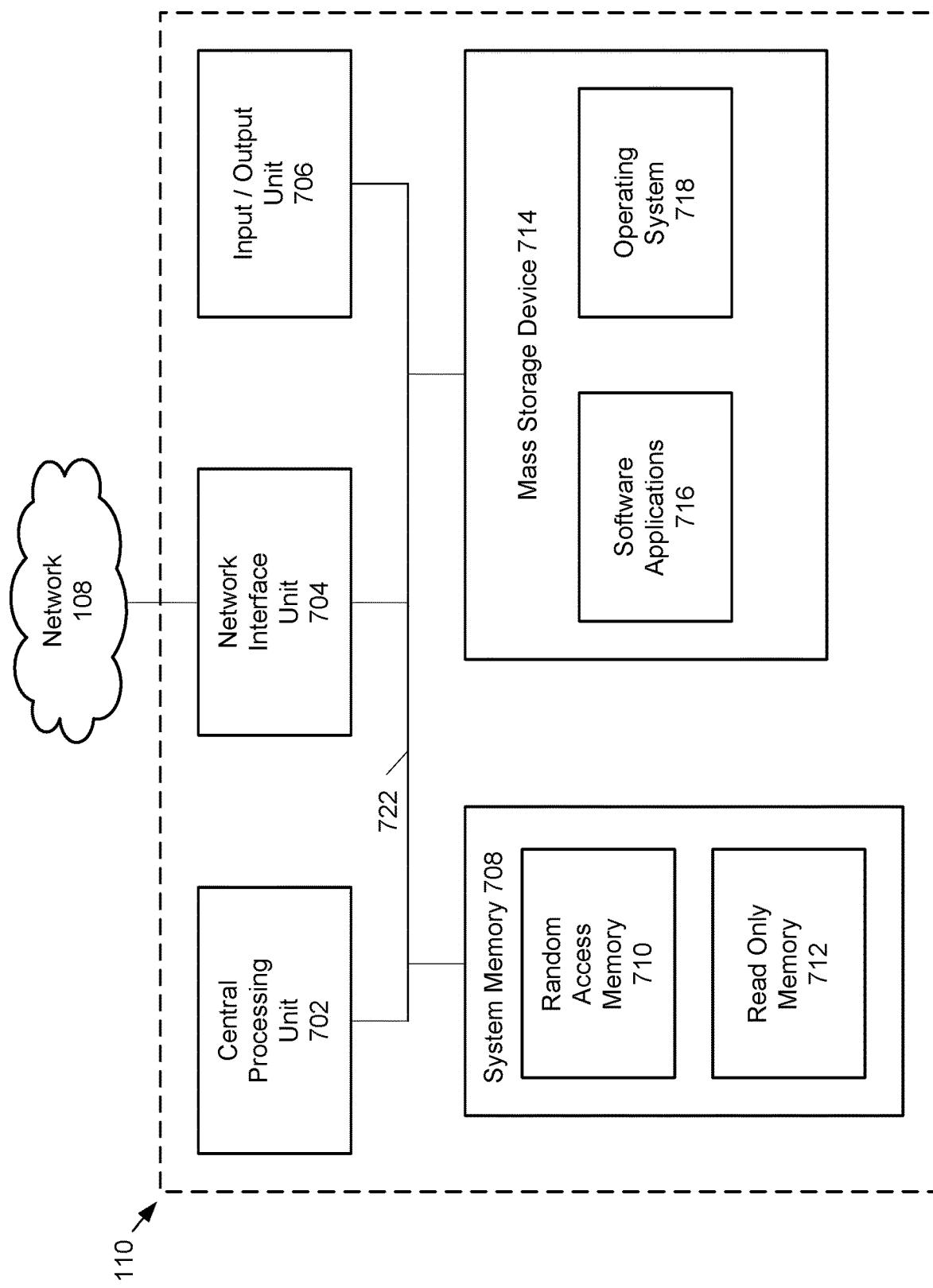

ered; comparing the MCC code, the average dollar amount of the of credit card transactions processed and the percentage of credit card transactions that are keyed with corresponding data from a database of merchant credit card transactions; identifying a matched merchant from the database whose transaction profile closely matches a combination of the MCC code, the number of credit card transactions processed, the sales volume of credit card transactions processed and the percentage of credit card transactions that are keyed transactions; and obtaining from the database, credit card processing pricing for the matched merchant; and assigning as credit card processing pricing for the merchant the credit card processing pricing for the matched merchant.

MERCHANT SERVICES STATEMENTS AND PRICING

BACKGROUND

Merchant services provides a way for merchants to process credit card transactions from customers. The merchant services can include equipment to process the credit card transactions, for example point of sale devices, and an account at a merchant services provider. A merchant services provider can implement processing of a credit card transaction and can set rates and fees for a merchant who uses the merchant services provider.

Various factors can determine how merchant services providers assign their rates and fees. In addition, rates and fees can vary among different merchant services providers. Merchants who use merchant services providers may periodically evaluate the rates and fees they pay and may inquire about changing their merchant services provider to obtain better rates.

SUMMARY

Embodiments of the disclosure are directed to a method implemented on an electronic computing device for determining credit card processing pricing for a merchant, comprising: on the electronic computing device, obtaining a merchant category classification (MCC) code for the merchant; obtaining a sales volume of credit card transactions processed by the merchant; obtaining a number of credit card transactions processed by the merchant; obtaining an average dollar amount of the credit card transactions processed by the merchant; obtaining a percentage of credit card transactions that are keyed, wherein credit card transactions that are keyed comprise credit card transactions in which one or more of a credit card account number or credit card security number are manually received; comparing the MCC code, the average dollar amount of the of credit card transactions processed and the percentage of credit card transactions that are keyed with corresponding data from a database of merchant credit card transactions; identifying a matched merchant from the database whose transaction profile closely matches a combination of the MCC code, the average dollar amount of the credit card transactions processed, and the percentage of credit card transactions that are keyed; obtaining from the database, credit card processing pricing information for the matched merchant; and using the credit card processing pricing information to calculate credit card processing pricing for the matched merchant.

In another aspect, a method implemented on an electronic computing device for determining credit card processing pricing for a merchant comprises: on the electronic computing device, receiving a scanned image of a merchant services statement of the merchant; extracting from the scanned image a merchant category classification (MCC) code for the merchant; extracting from the scanned image a number of transactions processed by the merchant; extracting from the scanned image a sales volume of credit card transactions processed by the merchant; obtaining a percentage of the credit card transactions that are keyed transactions, wherein one or more of a credit card number used in a transaction or a security code associated with the credit card are manually received; comparing the MCC code, the number of credit card transactions processed, the sales volume of credit card transactions processed and the percentage of credit card transactions that are keyed transactions with corresponding data from a database of merchant credit card transactions; identifying a matched merchant from the database whose transaction profile closely matches a combination of the MCC code, the number of credit card transactions processed, the sales volume of credit card transactions processed and the percentage of credit card transactions that are keyed transactions; and obtaining from the database, credit card processing pricing for the matched merchant; and assigning as credit card processing pricing for the merchant the credit card processing pricing for the matched merchant.

In yet another aspect, an electronic computing device comprises: a processing unit; and system memory, the system memory including instructions which, when executed by the processing unit, cause the electronic computing device to: receive a scanned image of a merchant services statement of a merchant; extract from the scanned image a merchant category classification (MCC) code for the merchant; extract from the scanned image a sales volume of credit card transactions processed by the merchant; extract from the scanned image a number of credit card transactions processed by the merchant; calculate an average dollar amount of the credit card transactions processed by the merchant; identify from the scanned image a format used on the merchant services statement; obtain a percentage of the sales volume of credit card transactions that are keyed transactions, wherein one or more of a credit card account number used in a transaction or a security code associated with the credit card are manually received; use a structured query language (SQL) command to query a database for a combination of the MCC code, the sales volume of credit card transactions processed by the merchant and the sales volume of credit card transactions that are keyed transactions; obtain a response from the database of a database record that closely matches the combination of the MCC code, the average dollar amount of the of credit card transactions processes by the merchant and the sales volume of credit card transactions that are keyed transactions; obtain a format of a merchant services statement from the database record; compare the identified format used on the merchant services statement with the format of the merchant services statement obtained from the database record; identify a matched merchant from the database whose transaction profile closely matches a combination of the MCC code, the average dollar amount of the credit card transactions processed, the percentage of credit card transactions that are keyed and the identified format; obtain from the database, an interchange cost for the matched merchant; and assigning as credit card processing pricing for the merchant a sum of the interchange cost for the matched merchant and one more additional costs, including a profit margin cost.

The details of one or more techniques are set forth in the accompanying drawings and the description below. Other features, objects, and advantages of these techniques will be apparent from the description, drawings, and claims.

DESCRIPTION OF THE DRAWINGS

FIG. 3 shows an example user interface screen that can be used to provide data for merchant services.

FIG. 6 shows a schematic diagram of an example merchant services statement.

FIG. 7 shows example physical components of the organization server computing device of the system of FIG. 1.

DETAILED DESCRIPTION

Figure 1:
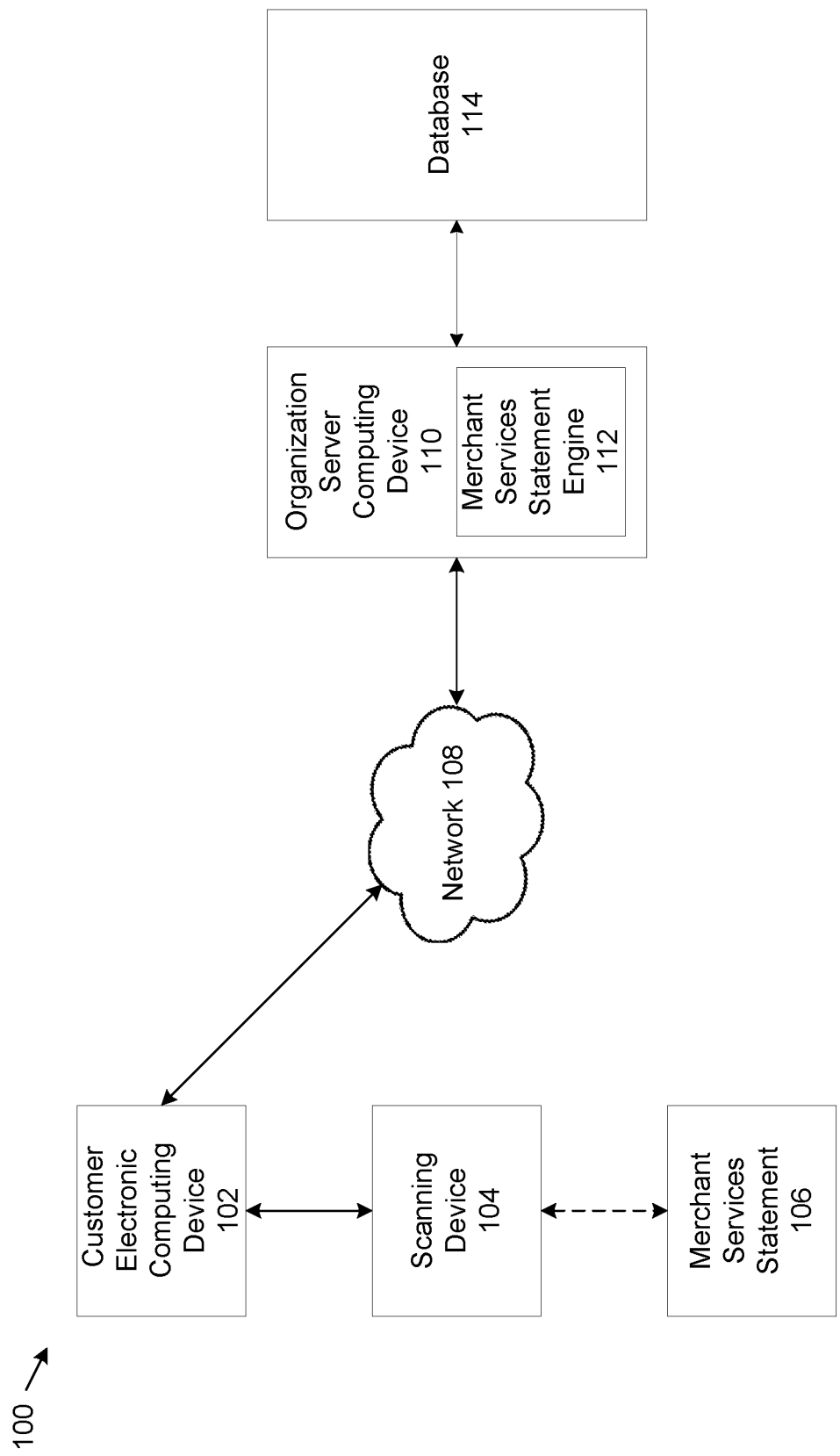
FIG. 1 shows an example system that supports an analysis of merchant service statements and merchant services provider pricing.

The present disclosure is directed to systems and methods for processing merchant services statements to determine pricing for merchant services providers. The systems and methods can permit a merchant services statement to be analyzed and, as a result of the analysis, permit merchant services provider pricing to be determined.

As used in this disclosure, a merchant services provider is an institution that processes credit card transactions for a merchant. As discussed in more detail later herein, various fees are associated with a credit card transaction. For each transaction processed, the merchant services provider deposits into the merchant account a dollar amount equal to a dollar amount of an item purchased during the transaction, less the various fees. Typically, deposits for merchant transactions are made periodically, for example at the end of a business day.

In one example implementation, information from a merchant services statement can be manually provided, by one of: a meeting with a financial services representative, a telephone call with the financial services representative or via a website. In an alternative implementation, the information from the merchant services statement can be automatically obtained, either via a barcode on the merchant services statement or by scanning the merchant services statement and obtaining the information. In an example implementation, the barcode can be a quick response (QR) barcode.

When the information is automatically obtained, the merchant services statement can be scanned and the information can be extracted from a scanned image of the merchant services statement. A software application on an electronic computing device, typically a server computer can be used to extract information such as the merchant category classification (MCC) code and sales volume from the merchant services statement. In some implementations, the software application can use artificial intelligence (AI). AI can be helpful in identifying a format of the merchant services statement, using the identified format to know where to look for specific information on the merchant services statement and to automatically extract the specific information from the scanned image of the merchant services statement.

Information from the merchant services statement that can be obtained can include items such as the MCC code, a number of credit card transactions processed at the merchant and a sales volume for the credit card transactions processed. This information can be used to obtain credit card processing pricing for the merchant. When the MCC code cannot be obtained from the merchant services statement, the MCC code can be provided by the merchant.

Other information that can determine credit card processing pricing for the merchant can include a percent of credit card transactions that are keyed transactions, a percent of credit card transactions that are business to business (B2B) transactions and a zip code of the merchant. The percent of credit card transactions that are keyed transactions comprises a percent of credit card transactions for which the credit card number and/or security code are communicated by telephone to a customer service representative or manually entered via a website. Credit card transactions that are keyed transactions typically have a higher processing charge than credit card transactions in which a credit card is swiped at a point of sales (POS) terminal. In some implementations, the percent of credit card transactions that are keyed transactions can be obtained from the merchant services statement. In other implementations, the percent of credit card transactions that are keyed transactions are provided by the merchant. In some implementations that MCC code for the merchant can be derived from the percent of credit card transactions that are keyed and a percent of transactions that are B2B transactions.

The MCC code can indicate a type of establishment at which the credit card is used and, based on the type of establishment and an amount of the transaction, a determination can be made as to a type of credit card that is used—for example a standard credit card or a premium credit card. The determination can be made by comparing the MCC code with other MCC codes for other credit card transactions stored in database 114 and determining types of credit cards used for MCC codes that are similar.

The MCC code is a four digit integer that can be organized by categories such as airlines, automobile/vehicle rentals, hotels and motels, retail stores, clothing stores, restaurants and other categories. For example, a fast food restaurant has an MCC code of 5814 and a restaurant other than fast food (for example a sit-down restaurant) has an MCC code of 5812.

A fee structure for processing credit card transactions includes several component fees. One component fee is known as an interchange fee. Another component fee is typically a payment network fee. A third component is an organization fee paid to the merchant services provider that can include a profit margin for the merchant services provider.

The interchange fee is a fee paid by merchants to credit card issuers (for example banks) for accepting credit cards. The interchange fee is typically around 80 percent of the total fees for a credit card transaction. However, the interchange fee can vary based on the credit card issuer and the type of credit card being used. Premium credit cards that offer higher rewards generally have a higher interchange fee than a basic credit card that may offer standard rewards or no rewards. For example, a Visa Signature Preferred credit card typically has a higher interchange fee than a basic Visa card.

The payment network fee is an assessment fee paid to a credit card association, for example Visa, MasterCard, Discover or American Express. The payment network fee, typically a small component of the total credit card fees, is charged by the credit card association on every transaction involving one of their credit cards.

The fee paid to the merchant services provider is a fee paid by the merchant for the services that the merchant services provider provides to the merchant. Such services include handling the processing of credit card transactions for the merchant, and depositing funds for the transactions (less fees) into the merchant account on a timely basis. In one example, the funds less fees can be deposited on a daily basis. In another example, a gross amount of the credit card transactions can be deposited on a daily basis and all processing fees related to credit card transactions for a month can be deposited on a monthly basis, typically on the following month. Other examples are possible.

Merchant services statements can be unbundled or bundled. Unbundled merchant services statements show the actual interchange cost. For unbundled merchant services statements, an actual interchange cost that the merchant paid during a month can be extracted from the merchant services statement. Bundled merchant services statements do not provide interchange data for the credit cards that a merchant accepted during a month. Bundled statements only provide either a flat rate, for example 2.8%, or the bundled statements may group transactions in categories to show tiered pricing, for example qualified, mid-qualified or non-qualified. For bundled statements, only an estimate of the interchange costs can be obtained.

The analysis of a merchant services statement to determine merchant services provider pricing can be complex because of a wide range of formats used on the statements and a wide range of credit card types and identifiers. For example, as stated earlier herein, interchange fees can vary based on a type of credit card. However, identifiers of the credit card type can be cryptic on a merchant services statement and difficult to identify. In addition, merchant services provider pricing can vary between different merchant services providers.

To address these issues, the systems and methods stores data for a plurality of merchant services statements. When a specific merchant services statement is analyzed, the specific merchant services statement is compared with the plurality of merchant services statements to determine which of the plurality of merchant services statements the specific merchant services statement is most similar. Once a comparison is made, a pricing profile of the matched merchant services statement can be applied to the specific merchant services statement.

Comparisons can be made because although there are a plurality of merchant services statement formats, a plurality of MCC codes and a plurality of merchant services providers, these combinations are somewhat limited. For example, there may only be a relatively small subset of MCC codes that are used most often, a relatively small number of statement formats that are used most often and a relatively small number of merchant services providers that are used most often. In addition, the MCC codes used can be mapped to a particular type of credit card used and therefore to a particular interchange fee. For example, a profile can indicate that for a certain MCC code (for example corresponding to a luxury hotel), a high-end rewards card is typically used.

The systems and methods also permits a prospective customer to upload a merchant services statement from a smartphone to a website of a merchant services provider. The merchant services provider can then analyze data in the merchant services statement and, using the comparisons discussed above, provide a price for providing merchant services to the prospective customer.

The systems and methods can also be applied to implementations other than merchant services statements. One example application in which the systems and methods can be implemented is treasury management. In a treasury management business, financial institution can process checks, money transfers and other transactions. Many of these transactions can be made electronically via an automated payment house (ACH) network. Using the systems and methods, treasury management statements for a financial institution can be analyzed and pricing information for handling the treasury management business can be provided to a prospective customer.

Other example applications in which the systems and methods can be applied can include financial spreading and supporting loan documents, for example involving mortgages. Financial spreading can comprise extracting certain data points from business financial statements, either by an employee of a financial organization or via a software program. Costs for various customers can be stored and compare with data for a prospective customer. Using comparisons, pricing information for handling this type of business can be provided to prospective customers.

The systems and methods disclosed herein are directed to a computer technology that stores merchant services data, including pricing information, for a plurality of merchants for which a merchant services provider organization provides merchant services. The systems and methods permit a prospective customer of the organization to have its merchant services statement(s) analyzed and to efficiently provide an estimate of a cost of merchant services for the prospective customer. By using machine learning and artificial intelligence to automatically analyze a merchant services statement of the prospective customer, the systems and methods provide the pricing information faster and more efficiently than current methods of analyzing the merchant services statement of the prospective customer.

FIG. 1 shows an example system 100 that can support an analysis of merchant service statements. System 100 includes a customer electronic computing device 102, a scanning device 104, a merchant services statement 106, a network 108, an organization server computing device 110 and a database 114. The organization server computing device 110 includes a merchant services statement engine 112. More, fewer or different components can be used.

The example customer electronic computing device 102 is an electronic computing device of a merchant who is a prospective customer of an organization that can provide merchant services. The electronic computing device can be any one of a desktop computer, laptop computer, tablet computer or smartphone. The prospective customer can provide merchant services statement information to the organization via the electronic computing device.

The example scanning device 104 is an electronic scanning device that can scan a merchant services statement 106 and send a scanned image of merchant services statement 106 to customer electronic computing device 102. In some implementations, customer electronic computing device 102 can send the scanned image to organization server computing device 110. In other implementations, a software application on customer electronic computing device 102 can extract merchant services statement information from the scanned image and send the merchant services statement information to organization server computing device 110.

The example network 108 is a computer network and can be any type of wireless network, wired network and cellular network, including the Internet. Customer electronic computing device 102 can communicate with organization server computing device 110 using network 108.

The example organization server computing device 110 is a server computing device of an organization that can provide merchant services to the prospective customer. In some implementations, the organization can be a financial institution such as a bank. In other implementations, the organization can be another type of financial institution such as an investment firm or a mortgage company.

The example merchant services statement engine 112 receives and analyzes data from a merchant services statement and uses the data to provide an estimate to the merchant for merchant services provided by the organization. In some implementations, the data is manually provided by the merchant, either through a telephone call or an in-person meeting with a representative of the organization or via a website of the organization. In other implementations, the data can be automatically obtained via scanning a merchant services statement from the merchant's current merchant services provider. Merchant services statement engine 112 uses data items such as MCC code, sales volume, number of transactions and percent of transactions keyed to calculate a pricing rate for the merchant for merchant services provided by the organization. Merchant services statement engine 112 can calculate an average dollar amount of the credit card transactions processed from the sales volume and number of transactions.

The example database 114 is a database associated with the organization of organization server computing device 110. Database 114 can store merchant services information for a plurality of merchants for which the organization provides merchant services. The information can include for each of the plurality of merchants such items as the MCC code of the merchant, the number of transactions, the sales volume of the transactions, a summary of the type of credit cards used for the transactions, the percent of transactions that are keyed, the percent of transactions in which the credit card is swiped, the percent of transactions that are business to business (B2B) transactions, the percent of transactions that are business to customer (B2C) transactions, pricing information for the merchant services, and other information. Organization server computing device 110 can store all or parts of the information in database 114. Database 114 can be distributed over a plurality of databases. Organization server computing device 110 can be programmed to query (e.g. using Structured Query Language, SQL) database 114 to obtain the merchant services information.

An example schema including, but not limited to, inventory information stored in database is shown below:

Merchant ID—a set or letters, numbers or other symbols that uniquely identifies a merchant;

Merchant Name—a name for the merchant associated with the merchant ID;

Zip code—a postal zip code for the merchant;

MCC code—a four digit number identifying a merchant classification code;

MCC description—an alphanumeric description of a merchant type associated with the MCC code;

Total Transactions—a number of credit card transactions processed at the merchant over a period of time, for example a month or a year;

Total sales volume—a dollar amount of the number of total transactions processed by the merchant over the period of time;

Percent transactions keyed—a number of the total transactions for which credit card information is manually entered;

Percent transactions swiped—a number of the transactions for which a credit card is swiped at a point of sale device;

B2B transactions—a number of transactions with other businesses;

B2C transactions—a number of transactions with retail customers;

Pointer to credit card types used for the transactions—a volume summary of credit cards used for the transactions of the period of time:

Credit card A—number of transactions; sales volume of transactions; percent transactions keyed; % B2B transactions; % B2C transactions;

Credit card B—number of transactions; sales volume of transactions; percent transactions keyed; % B2B transactions; % B2C transactions;

. . . .

Credit card n—number of transactions; sales volume of transactions; percent transactions keyed; % B2B transactions; % B2C transactions;

Pricing information—a price that the merchant pays for merchant services provided by the organization, including an interchange fee, a payment network fee and an organization fee;

The above schema permits the database to be queried for data such data as MCC code and pricing data per MCC code and sales volume. The schema can be bundled as a container so that the schema can be easily transferred, for example between property owners.

As an example, the following messaging format can be used between the organization server computing device 110 and the database 114 to obtain pricing information for a specific MCC code.

| Merchant ID | MCC Code | Percent Transactions Keyed | Number of Transactions | Total Sales Volume |
|---|---|---|---|---|

As an example, the database 114 can use the following messaging format in responding to such a request.

| Merchant ID | Merchant Name | MCC Code | Percent Transactions Keyed | Number of Transactions | Total Sales Volume | Price for Merchant Services |
|---|---|---|---|---|---|---|

The response message can include the merchant ID and merchant name of the identified merchant in database 114, the MCC code, percent transactions keyed, the number of transactions, the total sales volume for this merchant and the price that the merchant pays the organization for merchant services. The response message can also include data for one or more additional merchants with the six response fields above. For example, if there is more than one merchant having the same MCC code and percent transactions keyed and sales volume data similar to that in the request for pricing information, the response message can include similar data fields showing pricing data for the additional merchants. More, fewer, or different fields can be used. Other examples are possible.

Figure 2:
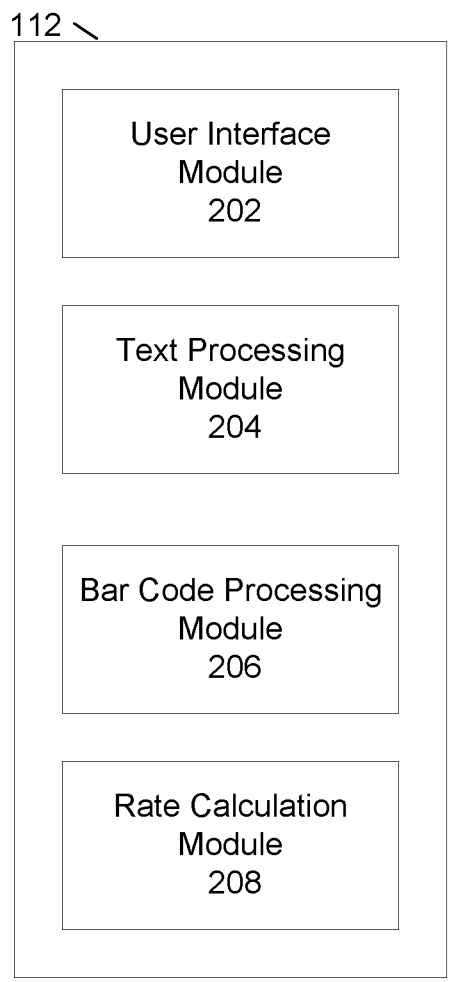
FIG. 2 shows example modules of the merchant services statement engine of FIG. 1.

FIG. 2 shows example modules of merchant services statement engine 112. The example modules include a user interface module 202, a text processing module 204, a barcode processing module 206 and a rate calculation module 208. More, fewer or different module are possible.

The example user interface module 202 provides a user interface to a customer at customer electronic computing device 102 from which the prospective customer can manually enter merchant services data. User interface module 202 can also display a proposed price to the customer for merchant services that can be provided by the organization. User interface module 202 is described in more detail later herein.

The example text processing module 204 receives a scanned image of a merchant services statement of a prospective customer from customer electronic computing device 102 and parses and extracts textual and numerical data from the merchant services statement. Data that can be extracted and parsed can include the MCC code, the number of transactions, the sales volume and the percent transactions keyed. Other fields from the merchant services statement can also be extracted and parsed. In some implementations, customer electronic computing device 102 can extract and parse data from the scanned image of the merchant services statement. In this implementation, text processing module 204 can receive the parsed and extracted data from customer electronic computing device 102.

Text processing module 204 is configured to recognize text on the most common merchant services statement formats. Examples of common merchant services statement formats include formats from Chase PaymentTech, Bank of America Merchant Services, Vantiv Payment Processing, First Data Credit Card Processing and Global Payments. Based recent data, these formats are used in statements for about 80 percent of credit card purchase transactions.

The example barcode processing module 206 receives a scanned image of a barcode on the merchant services statement from customer electronic computing device 102. The barcode can comprise a quick response (QR) code. The barcode can included embedded data for such items as the MCC code, the percent of keyed transactions, the number of credit card transactions and the sales volume. Barcode processing module 206 can process the scanned image of the barcode and extract the information embedded in the barcode.

The example rate calculation module 208 uses the data from the merchant services statement and data manually entered to determine a price of merchant services for the prospective customer that can be provided by the organization. As discussed, the data can include the MCC code, the number of credit card transactions, the sales volume of the credit card transactions and the percentage of credit card transactions that are keyed. In addition, the rate calculation module 208 can calculate an average transaction amount from the number of credit card transactions and the sales volume of these credit card transactions.

The rate calculation module 208 determines the pricing for the merchant services by comparing the data from the merchant services statement of the prospective customer with data from other merchants stored in database 114 and building a cost model. Rate calculation module 208 can first obtain merchant data from database 114 having the same MCC code as on the merchant services statement of the prospective customer. Rate calculation module 208 can also determine a format used on the merchant services statement of the prospective customer and obtain merchant pricing data from database 114 based on the format used.

Rate calculation module 208 can further filter the merchants having the same MCC code and format used as on the merchant services statement of the prospective customer by percent of transactions keyed, sales volume and average transaction amount. If there is one clear match, pricing data for the merchant associated with the match can be identified and returned to the prospective customer at customer electronic computing device 102. If there are a plurality of merchants that have close matches, rate calculation module 208 can interpolate prices or otherwise determine a proposed price for merchant services for the customer.

In some implementations, rate calculation module 208 can use AI and machine learning to upload a merchant services statement, access information regarding the prospective customer stored online or receive needed information from the prospective customer and automatically generate a proposed price for merchant services for the prospective customer. For example, the AI and/or machine learning can recognize a sales volume and a type of business and can access a credit history and business documents on file for the prospective customer. Based on these and other data, the rate calculation module 208 can offer a proposed price for merchant services to the prospective customer. For businesses without a merchant services statement, the rate calculation module 208 can provide example costs for various monthly sales volume levels.

The proposed price for merchant services for the prospective customer can comprise an interchange fee, a network fee and an organization fee. The organization fee can comprise a cost for the organization to process transactions for the customer plus a profit margin for the organization that can be added on.

FIG. 3 shows an example user interface 300 for credit card transactions via which a prospective customer at customer electronic computing device 102 can provide merchant services statement data to the organization. User interface 300 can be rendered on a display screen of customer electronic computing device 102 when the prospective customer logs into to a website of the organization, for example a website hosted by organization server computing device 110.

User interface 300 includes fields 302, 304 and 306 via which the prospective customer can enter a monthly time period, an MCC code and an MCC description, respectively. As shown in FIG. 3 and example time period 302 is October 2017, an example MCC code 304 is 5732 and a description 306 for the MCC code is electronic sales. The description 306 field can be automatically populated based on the MCC code.

User interface 300 also includes an example table 308 via which the prospective customer can enter data regarding credit card transactions processed during October 2017. Table 308 includes columns for card type 310, number of transactions 312, sales volume 314 and percent keyed 316. Table 308 also includes rows for Visa 318, Master Card 320, Discover Card 324, AMEX 326 and total 328. As an example from table 308, for the month of October 2017, there were 40 Visa credit card transactions for a total sales volume of $20,000.00 and 50% of these transactions were keyed. As another example from table 308, for the month of October 2017, there were 5 AMEX (American Express) transactions for a total sales volume of $5,000.00 and 15% of these transactions were keyed. Rate calculation module 208 can use data entered into user interface 300 to compare the merchant transaction data with data for other merchants stored in database 114. Based on the comparison, rate calculation module 208 can calculate merchant services pricing for the prospective customer, as discussed earlier herein.

Figure 4:
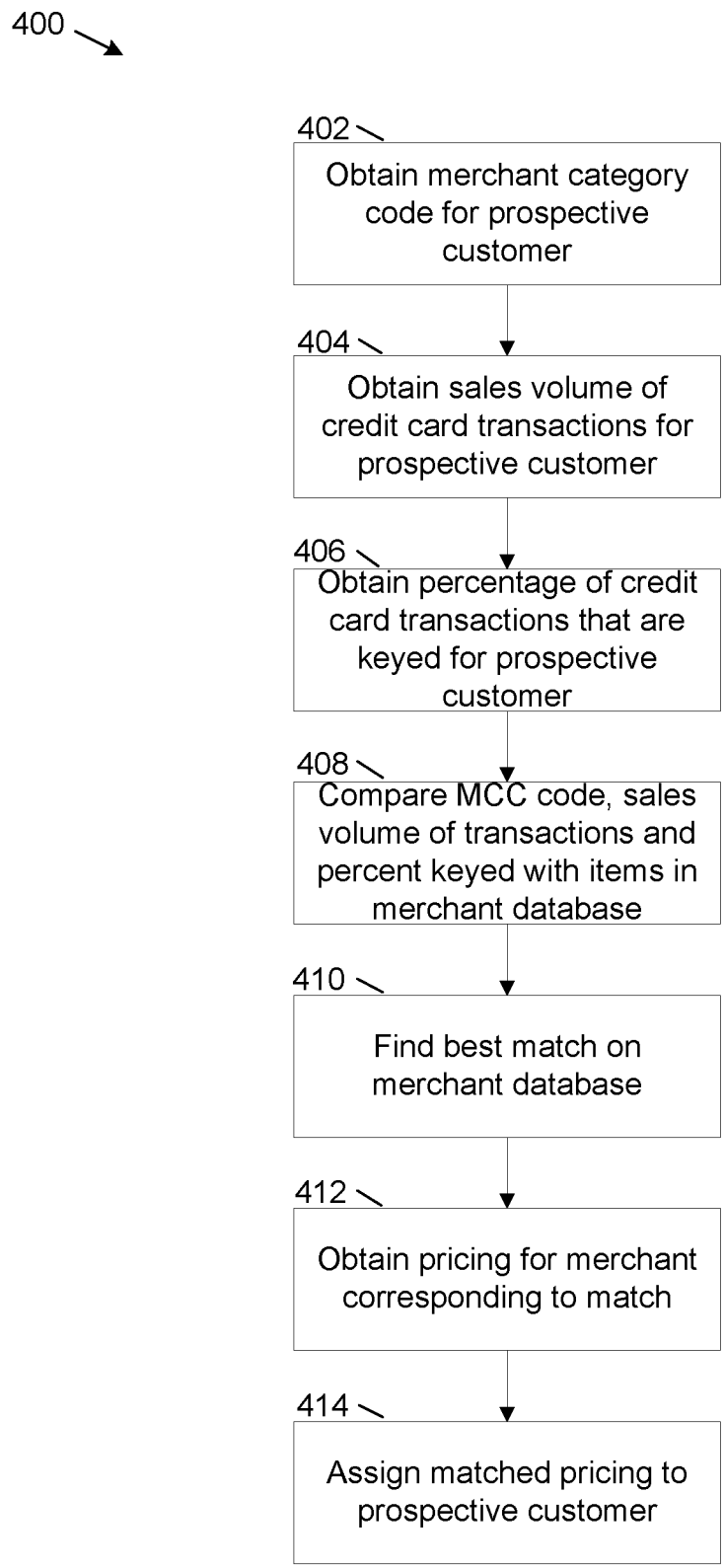
FIG. 4 shows an example method for determining merchant services pricing.

FIG. 4 shows a flowchart for an example method 400 for determining merchant services pricing for a prospective customer of an organization that provides merchant account services. For method 400, information regarding the merchant transactions for the prospective customer are provided manually by the prospective customer, via one of a personal meeting with a representative of the organization, a telephone call with the representative of the organization or via entering the information on a website of the organization.

At operation 402, a merchant category classification code (MCC) for the business of the prospective customer is obtained from the prospective customer. The MCC code is a four digit number that identifies the type of business. The MCC code is important for determining pricing for the prospective customer because some fees, for example the interchange fee can be directly or indirectly dependent on the type of business of the prospective customer. The MCC code can be indirectly related to the exchange fee because certain MCC codes (for example for upscale retail stores) can indicate that a high-end credit card may be used at that the upscale retail store, and use of the high-end credit card may be associated with a high interchange fee.

At operation 404, a sales volume of credit card transactions for the prospective customer is obtained. The sales volume can include a breakdown of credit card transactions for different types of credit cards, such as Visa, Master Card and American Express. The sales volume of credit card transactions is typically represents a dollar amount the of credit card transactions processed at retail stores of the prospective customer during a month, although other time intervals can be used. An average dollar amount of the credit card transactions can be calculated from the sales volume.

At operation 406, a percentage of credit card transactions that are keyed for the prospective customer are obtained. The credit card transactions that are keyed are those in which either the credit card account number, the three-digit security code associated with the credit card are either entered on an online website of the prospective customer or are provided over the telephone when a purchase is made. The percentage of credit card transactions that are keyed and a percentage of credit card transactions that occur as result of swiping a credit card at a POS terminal in a retail store of the prospective customer equals 100 percent.

At operation 408, the MCC code, the volume of transactions and the percentage of credit card transactions that are keyed are compared with merchant data stored on a database of the organization, for example database 114. The database can store transaction data from merchants who are currently or who have been customers of the organization. The transaction data can include the MCC code of the merchant, transaction data for each type of credit card used, the percent of credit card transactions that are keyed and pricing data for each merchant for merchant services provided by the organization. The pricing data can comprise a single price for the merchant services or can comprise a pricing schedule based on a volume of transactions.

At operation 410, a best match is found for the prospective customer on the database. The best match typically comprises a merchant record on the database for which the MCC code is the same as for the prospective customer and for which a combination of the volume of transactions and percentage transactions that are keyed are closest to those of the prospective customer. A match of the volume of transactions typically occurs after the MCC code match, followed by a match of the percentage of transactions that are keyed.

At operation 412, pricing data is obtained from the database for the merchant with the best match to the prospective customer.

At operation 414, the pricing data with the best match is then assigned to the prospective customer. This pricing data can then be communicated to the prospective customer as a price that the prospective customer would pay if the prospective customer used the merchant services of the organization.

Figure 5:
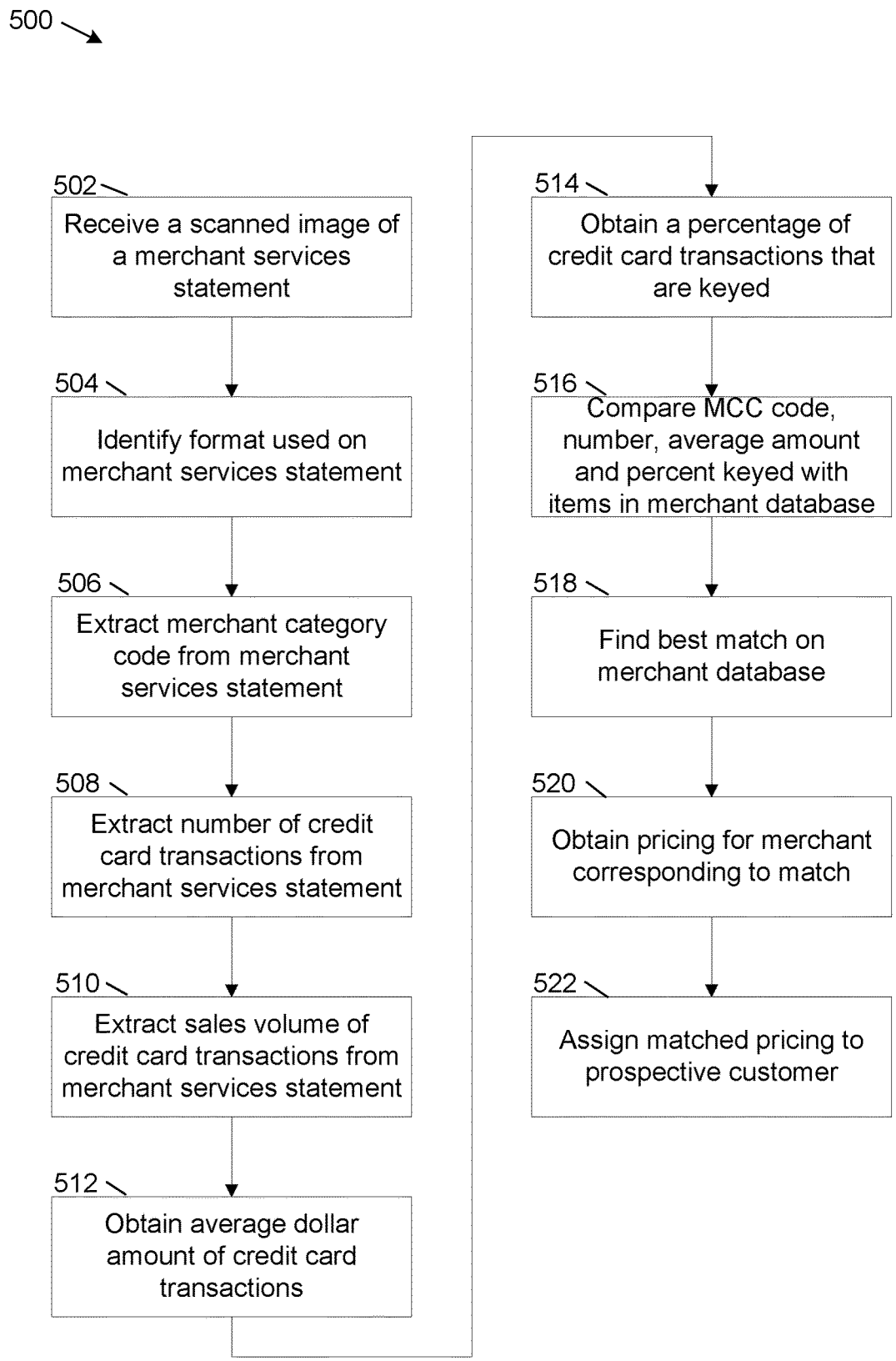
FIG. 5 shows another example method for determining merchant services pricing.

FIG. 5 shows a flowchart for another example method 500 for determining merchant services pricing for a prospective customer of an organization that provides merchant account services. For method 500, information regarding the merchant transactions for the prospective customer are provided, at least in part, as a result of scanning an merchant services statement from a current merchant services provider of the prospective customer.

At operation 502, a scanned image of the merchant services statement is obtained at organization server computing device 110. For example, merchant services statement 106 can be scanned by scanning device 104 that is connected to or is a part of customer electronic computing device 102. The scanned image is then sent from customer electronic computing device 102 to organization server computing device 110.

At operation 504, a format used in merchant services statement 106 is identified from the scanned image. Software on organization server computing device 110 can be used to identify the scanned image. In some implementations, the software comprises an artificial intelligence (AI) software application. Most merchant services statements use one of a small number (typically 5-10) of formats available for merchant services statements. The software on organization server computing device 110 can parse the scanned image of merchant services statement 106 and determine whether the format used on merchant services statement 106 corresponds to one of the typically used formats.

At operation 506, the merchant category classification (MCC) code is extracted from the scanned image of merchant services statement 106. The software application can make use to the identified format of merchant services statement 106 to determine where the MCC code is on merchant services statement 106.

At operation 508, the number of credit card transactions processed is extracted from merchant services statement 106. The number represents the credit card transactions processed by the merchant during a time period, typically one month. In some implementations, in addition to the total number of transactions processed by the merchant during the time period, separate totals are extracted for each type of credit card processed, for example Visa or American Express.

At operation 510, the volume of credit card transactions is extracted from merchant services statement 106. The volume represents the credit card transactions processed by the merchant during a time period, typically one month. In some implementations, in addition to the total volume of transactions processed by the merchant during the time period, separate totals are extracted for each type of credit card processed, for example Visa or American Express.

At operation 512, the number of credit card transactions and the volume of the credit card transactions is used to calculate an average dollar amount of the credit card transactions. In some implementations, the average dollar amount of the credit card transactions can be obtained directly from a merchant services statement.

At operation 514, a percentage of credit card transactions that are keyed are obtained. The credit card transactions that are keyed are those in which either the credit card account number, the three-digit security code associated with the credit card are either entered on an online website of the prospective customer or are provided over the telephone when a purchase is made.

At operation 516, the MCC code, the number of transactions, the average dollar amount of the credit card transactions and the percentage of credit card transactions that are keyed are compared with merchant data stored on database 114. Database can store transaction data from merchants who are currently or who have been customers of the organization. The transaction data can include the MCC code of the merchant, transaction data for each type of credit card used, the percent of credit card transactions that are keyed and pricing data for each merchant for merchant services provided by the organization. The pricing data can comprise a single price for the merchant services or can comprise a pricing schedule based on a volume of transactions.

At operation 518, a best match is found for the prospective customer on the database. The best match typically comprises a merchant record on the database for which the MCC code is the same as for the prospective customer and for which a combination of the number of transactions, the sales volume of transactions and percentage transactions that are keyed are closest to those of the prospective customer. A match of the volume of transactions typically occurs after the MCC code match, followed by a match of the percentage of transactions that are keyed.

At operation 520, pricing data is obtained from the database for the merchant with the best match to the prospective customer.

At operation 522, the pricing data with the best match is then assigned to the prospective customer. This pricing data can then be communicated to the prospective customer as a price that the prospective customer would pay if the prospective customer used the merchant services of the organization.

FIG. 6 shows a schematic diagram of an example merchant services statement 600. The example merchant services statement 600 includes four sections, an overall summary 602 for a statement period, a card type summary 604, a transactions listing 606 and a fees summary 608. In an actual merchant services statement, more, fewer of different sections and entries can be used. For example, not all merchants accept debit/ATM transactions or AMEX transactions. In addition, other merchant services statements can have different formats than example merchant services statement 600.

The example overall summary 602 shows a total dollar amount (sales volume) of credit card transactions submitted during the statement period, any adjustments, such due to returns, canceled transactions, etc., any fees charged and a total dollar amount processed. As shown in overall summary 602, for the statement period shown, $23,283.64 of credit card statements were submitted for processing, $921.10 of fees were charged and there were no adjustments. The total dollar amount processed during the payment period was $22,362.54 ($23,283.64-$921.10).

The example card type summary 604 lists categories of credit card types processed during the payment period, the number of credit card transactions for each credit card type, the total sales volume dollar amount of these credit card transactions and the average dollar amount of the credit card transactions. The average amount is obtained by dividing the total amount by the number of credit card transactions. As shown in card type summary 604, during the statement period there were 157 Master Card transactions, for a total dollar amount of $3,890.03 and an average dollar amount per credit card transaction of $24.78. There were also 520 Visa credit card transactions for a total dollar amount of $9,874.78 and an average dollar amount per credit card transaction of $18.99, 66 American Express credit card transactions for a total dollar amount of $1,483,25 and an average dollar amount per credit card transaction of $22.47 and 295 Visa credit card transactions for a total dollar amount of $8,035.58 and an average dollar amount per credit card transaction of $27.24, resulting in a total of 1,038 credit card transactions during the payment period for a total dollar amount of $23,283.64.

The example transactions listing 606 lists details of each credit card transaction processed during the statement period. The details shown in transactions listing 606 include the data of the credit card transaction, the amount submitted, any fees associated with the transaction and the dollar amount processed. A textual description of each transaction is also provided. Other information is possible for the transactions listing 606.

The example fees summary 608 provides a summary of all fees charged during the statement period for processing the credit card transactions. The fees charged can include interchange charges, payment network fees and organization fees, as discussed earlier herein. As shown in fees summary 608, the total fees of $921.10 during the statement period includes $736.88 of interchange charges, $46.06 of payment network fees and $138.16 of organization fees.

As illustrated in the example of FIG. 7, organization server computing device 110 includes at least one central processing unit ("CPU") 702, also referred to as a processor, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the organization server computing device 110, such as during startup, is stored in the ROM 712. The organization server computing device 110 further includes a mass storage device 714. The mass storage device 714 is able to store software instructions and data. Some or all of the components of the organization server computing device 110 can also be included in customer electronic computing device 102.

The mass storage device 714 is connected to the CPU 702 through a mass storage controller (not shown) connected to the system bus 722. The mass storage device 714 and its associated computer-readable data storage media provide non-volatile, non-transitory storage for the organization server computing device 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the organization server computing device 110.

According to various embodiments of the invention, the organization server computing device 110 may operate in a networked environment using logical connections to remote network devices through the network 108, such as a wireless network, the Internet, or another type of network. The organization server computing device 110 may connect to the network 108 through a network interface unit 704 connected to the system bus 722. It should be appreciated that the network interface unit 704 may also be utilized to connect to other types of networks and remote computing systems. The organization server computing device 110 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the organization server computing device 110 can store software instructions and data. The software instructions include an operating system 718 suitable for controlling the operation of the organization server computing device 110. The mass storage device 714 and/or the RAM 710 also store software instructions and software applications 716, that when executed by the CPU 702, cause the organization server computing device 110 to provide the functionality of the organization server computing device 110 discussed in this document. For example, the mass storage device 714 and/or the RAM 710 can store software instructions that, when executed by the CPU 702, cause the organization server computing device 110 to display received data on the display screen of the organization server computing device 110.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for determining credit card processing pricing for a merchant, the method comprising:
    on the electronic computing device, obtaining a merchant category classification (MCC) code for the merchant;
    receiving a scanned image of a merchant services statement;
    analyzing the scanned image of the merchant services statement via a machine learning algorithm to automatically determine a format of the merchant services statement from a plurality of formats;
    obtaining, using the machine learning algorithm, a sales volume of credit card transactions processed by the merchant, a number of credit card transactions processed by the merchant, an average dollar amount of the credit card transactions processed by the merchant, and a percentage of credit card transactions that are keyed, wherein credit card transactions that are keyed comprise credit card transactions in which one or more of a credit card account number or credit card security number are manually received;
    identifying a plurality of merchants whose MCC code matches the MCC code of the merchant;
    comparing the average dollar amount of the credit card transactions processed, the percentage of credit card transactions that are keyed, and the format used on the merchant services statement with corresponding data from the database of merchants whose MCC code matches the MCC code of the merchant comprising merchant credit card transactions;
    identifying a matched merchant from the database whose transaction profile closely matches a combination of the average dollar amount of the credit card transactions processed and the percentage of credit card transactions that are keyed;
    obtaining from the database, credit card processing pricing information including an interchange fee, a payment network fee, and an organization fee, for the matched merchant;
    using the credit card processing pricing information to calculate credit card processing pricing for the matched merchant; and
    displaying, on the electronic computing device, a result including at least one of an interchange fee, a network fee, and an organization fee for the matched merchant.

2. The method of claim 1, wherein the credit card pricing information comprises an interchange cost to the merchant and wherein the credit card processing pricing to the merchant comprises the interchange cost plus one or more additional costs, including a profit margin cost.

3. The method of claim 1, further comprising using the machine learning algorithm to identify a format used on the merchant services statement.

4. The method of claim 3, further comprising:
    comparing the identified format along with the MCC code and the sales volume of credit card transactions processed with the corresponding data from the database of merchant credit card transactions; and
    identifying the matched merchant from the database whose transaction profile closely matches a combination of the MCC code, the sales volume of credit card transactions processed and the identified format used on the merchant services statement.

5. The method of claim 2, further comprising extracting the MCC code from a QR code on the merchant services statement.

6. The method of claim 1, further comprising:
    receiving a scanned image of the merchant services statement of the merchant; and
    extracting the MCC code and the sales volume of credit card transactions processed from a barcode on the merchant services statement.

7. The method of claim 6, further comprising extracting pricing rates from the barcode.

8. The method of claim 1, further comprising querying the database, using a structured query language (SQL) command, for a combination of the MCC code and the total sales volume of credit cards processed by the merchant.

9. The method of claim 1, further comprising:
    receiving a zip code of the merchant; and
    using the zip code along with the average dollar of the credit card transactions and percentage of credit card transactions that are keyed to identify the matched merchant from the database.

10. The method of claim 9, further comprising:
    obtaining a percentage of credit card transactions for the merchant that are business to business (B2B) transactions; and
    using the percentage of credit card transactions that are B2B transactions along with the sales volume of credit card transactions processed by the merchant and the percentage of credit card transactions processed that are keyed transactions to identify the matched merchant from the database.

11. A method implemented on an electronic computing device for determining credit card processing pricing for a merchant, the method comprising:
    on the electronic computing device, receiving a scanned image of a merchant services statement of the merchant;
    analyzing the scanned image of the merchant services statement via a machine learning algorithm to automatically determine a format of the merchant services statement from a plurality of formats;

extracting from the scanned image, via the machine learning algorithm, a merchant category classification (MCC) code for the merchant;

extracting from the scanned image, via the machine learning algorithm, a number of transactions processed by the merchant;

extracting from the scanned image, via the machine learning algorithm, a sales volume of credit card transactions processed by the merchant;

obtaining a percentage of the credit card transactions that are keyed transactions, wherein one or more of a credit card number used in a transaction or a security code associated with the credit card are manually received;

identifying a plurality of merchants whose MCC code matches the MCC code of the merchant;

comparing the number of credit card transactions processed, the sales volume of credit card transactions processed and the percentage of credit card transactions that are keyed transactions with corresponding data from a database of merchants whose MCC code matches the MCC code of the merchant comprising merchant credit card transactions;

identifying a matched merchant from the database whose transaction profile closely matches a combination of the number of credit card transactions processed, the sales volume of credit card transactions processed and the percentage of credit card transactions that are keyed transactions;

obtaining from the database, credit card processing pricing information including an interchange fee, a payment network fee, and an organization fee, for the matched merchant;

assigning as credit card processing pricing for the merchant the credit card processing pricing for the matched merchant; and displaying, on the electronic computing device, a result including the credit card processing pricing for the matched merchant.

12. The method of claim 11, further comprising:
identifying a format used on the merchant services statement;

comparing the identified format along with the number of credit card transactions processed, the sales volume of credit card transactions processed and the percentage of credit card transactions that are keyed transactions with the corresponding data from the database of merchant credit card transactions; and identifying the matched merchant from the database whose transaction profile closely matches a combination of the number of credit card transactions processed, the sales volume of credit card transactions processed, the percentage of credit card transactions that are keyed transactions and the identified format used on the merchant services statement.

13. The method of claim 11, further comprising extracting from the scanned image a sales volume of credit card transactions processed for each of a plurality of credit card types.

14. The method of claim 13, wherein comparing the sales volume of credit card transactions processed with corresponding data from the database of merchant credit card transactions comprises comparing the sales volume of credit card transactions processed for each of the credit card types with corresponding data from the database of merchant credit card transactions.

15. The method of claim 11, wherein the scanned image of the merchant services statement includes a quick response (QR) barcode and the MCC code is extracted from the QR barcode.

16. An electronic computing device comprises:
a processor; and
system memory, the system memory including instructions which, when executed by the processor, cause the electronic computing device to:

receive a scanned image of a merchant services statement of a merchant;

analyze the scanned image of the merchant services statement via a machine learning algorithm to automatically determine a format of the merchant services statement from a plurality of formats;

extract from the scanned image, via the machine learning algorithm, a merchant category classification (MCC) code for the merchant;

extract from the scanned image, via the machine learning algorithm, a sales volume of credit card transactions processed by the merchant;

extract from the scanned image, via the machine learning algorithm, a number of credit card transactions processed by the merchant;

obtain an average dollar amount of the credit card transactions processed by the merchant;

identify from the scanned image a format used on the merchant services statement;

obtain a percentage of the sales volume of credit card transactions that are keyed transactions, wherein one or more of a credit card account number used in a transaction or a security code associated with the credit card are manually received;

identify a plurality of merchants whose MCC code matches the MCC code of the merchant;

use a structured query language (SQL) command to query a database of a plurality of merchants whose MCC code matches the MCC code of the merchant for a combination of the sales volume of credit card transactions processed by the merchant and the sales volume of credit card transactions that are keyed transactions;

obtain a response from the database of a database record that closely matches the combination of the average dollar amount of the credit card transactions processes by the merchant and the sales volume of credit card transactions that are keyed transactions;

obtain a format of a merchant services statement from the database record;

compare the identified format used on the merchant services statement with the format of the merchant services statement obtained from the database record;

identify a matched merchant from the database whose transaction profile closely matches a combination of the average dollar amount of the credit card transactions processed, the percentage of credit card transactions that are keyed and the identified format;

obtain from the database, an interchange cost for the matched merchant; and assign, as credit card processing pricing for the merchant, a sum of the interchange cost for the matched merchant and one more additional costs, including a profit margin cost.

* * * * *